United States Patent [19]
Briggs et al.

[11] Patent Number: 5,144,576
[45] Date of Patent: Sep. 1, 1992

[54] SIGNED DIGIT MULTIPLIER

[75] Inventors: Willard S. Briggs, Carrollton; David W. Matula, Dallas, both of Tex.

[73] Assignee: Cyrix Corporation, Richardson, Tex.

[21] Appl. No.: 402,798

[22] Filed: Sep. 5, 1989

[51] Int. Cl.⁵ .............................................. G06F 7/52
[52] U.S. Cl. ................................................... 364/754
[58] Field of Search ............... 364/754, 757, 761, 764, 364/736, 745, 715.03, 760

[56] References Cited

U.S. PATENT DOCUMENTS

| | | | |
|---|---|---|---|
| 3,795,880 | 3/1974 | Singh et al. | 325/164 |
| 4,168,530 | 9/1979 | Gajski et al | 364/760 |
| 4,293,922 | 10/1981 | Davis et al. | 364/757 |
| 4,338,675 | 7/1982 | Palmer et al. | 364/748 |
| 4,495,593 | 1/1985 | Ware | 364/757 |
| 4,575,812 | 3/1986 | Kloker et al. | 364/760 |
| 4,594,678 | 6/1986 | Uhlenhoff | 364/736 |
| 4,638,449 | 1/1987 | Frey | 364/760 |
| 4,748,580 | 5/1988 | Ashton et al. | 364/736 |
| 4,754,421 | 6/1988 | Bosshart | 364/757 |
| 4,760,544 | 7/1988 | Lamb | 364/736 |
| 4,825,401 | 4/1989 | Ikumi | 364/760 |
| 4,878,190 | 10/1989 | Darley et al. | 364/761 X |

OTHER PUBLICATIONS

"An Architecture for a Rational Arithmetic Unit" by Shrikant N. Parikh, Oct. 16, 1988.

Primary Examiner—Tan V. Mai
Attorney, Agent, or Firm—Laurence S. Rogers

[57] ABSTRACT

A rectangular array signed digit multiplier circuit (10) is disclosed which comprises a multiplier core (28). The circuit (10) comprises a C-latch (14), a D-latch (18), an A-latch (26), and a feedback latch (52) operable to store operands to be input into the multiplier core (28) through a MULTIPLIER INPUT, a multiplicand INPUT, and ADDER INPUT and a FEEDBACK INPUT, respectively, The product output by the multiplier core (28) may comprise the sum of the product of the values input through the MULTIPLIER INPUT and MULTIPLICAND INPUT and the ADDER and FEEDBACK INPUTS. The product is stored in a result latch (40) and may be used in subsequent passes through multiplier core (28) through the use of a data path coupling result latch (40) with feedback latch (52). Multiplier core (28) comprises a series connection of a times three adder level (56), a Booth recoder level (58), a partial product generator level (60), a level one adder level (62), a level two adder level (64) and a level three adder level (66).

16 Claims, 4 Drawing Sheets

| BORROW IN | CARRY IN | X | Y | BORROW OUT | CARRY OUT | Z |
|---|---|---|---|---|---|---|
| 0 | 0 | -1 | -1 | 1 | 0 | 0 |
| 0 | 0 | -1 | 0 | 1 | 1 | -1 |
| 0 | 0 | -1 | 1 | 1 | 1 | 0 |
| 0 | 0 | 0 | -1 | 1 | 1 | -1 |
| 0 | 0 | 0 | 0 | 0 | 0 | 0 |
| 0 | 0 | 0 | 1 | 0 | 1 | -1 |
| 0 | 0 | 1 | -1 | 1 | 1 | 0 |
| 0 | 0 | 1 | 0 | 0 | 1 | -1 |
| 0 | 0 | 1 | 1 | 0 | 1 | 0 |
| 0 | 1 | -1 | -1 | 1 | 0 | 1 |
| 0 | 1 | -1 | 0 | 1 | 1 | 0 |
| 0 | 1 | -1 | 1 | 1 | 1 | 1 |
| 0 | 1 | 0 | -1 | 1 | 1 | 0 |
| 0 | 1 | 0 | 0 | 0 | 0 | 1 |
| 0 | 1 | 0 | 1 | 0 | 1 | 0 |
| 0 | 1 | 1 | -1 | 1 | 1 | 1 |
| 0 | 1 | 1 | 0 | 0 | 1 | 0 |
| 0 | 1 | 1 | 1 | 0 | 1 | 1 |
| 1 | 0 | -1 | -1 | 1 | 0 | -1 |
| 1 | 0 | -1 | 0 | 1 | 0 | 0 |
| 1 | 0 | -1 | 1 | 1 | 1 | -1 |
| 1 | 0 | 0 | -1 | 1 | 0 | 0 |
| 1 | 0 | 0 | 0 | 0 | 0 | -1 |
| 1 | 0 | 0 | 1 | 0 | 0 | 0 |
| 1 | 0 | 1 | -1 | 1 | 1 | -1 |
| 1 | 0 | 1 | 0 | 0 | 0 | 0 |
| 1 | 0 | 1 | 1 | 0 | 1 | -1 |
| 1 | 1 | -1 | -1 | 1 | 0 | 0 |
| 1 | 1 | -1 | 0 | 1 | 0 | 1 |
| 1 | 1 | -1 | 1 | 1 | 1 | 0 |
| 1 | 1 | 0 | -1 | 1 | 0 | 1 |
| 1 | 1 | 0 | 0 | 0 | 0 | 0 |
| 1 | 1 | 0 | 1 | 0 | 0 | 1 |
| 1 | 1 | 1 | -1 | 1 | 1 | 0 |
| 1 | 1 | 1 | 0 | 0 | 0 | 1 |
| 1 | 1 | 1 | 1 | 0 | 1 | 0 |

*FIG. 3*

| C-LATCH QUADRANT | SHIFTER 54 CONTROL | MULTIPLIER INPUT | | MULTIPLIER CARRY IN |
|---|---|---|---|---|
| | | MSB | LSB | |
| FIRST | 0 | c[17] | c[16:0] | 0 |
| SECOND | 0 | c[35] | c[34:18] | c[17] |
| THIRD | 0 | c[53] | c[52:36] | c[35] |
| FOURTH | 0 | 0 | c[70:54] | c[53] |
| SECOND (20 BIT) | c[35:34] | c[34] | c[33:17] | 0 |
| CONSTANTS FROM CONSTANT PORT 30 | | | | |
| 0 | 0 | 0 | 0 | 0 |
| 10*2^-17 | 0 | 0 | 00A HEX | 0 |
| 2^-1 | 0 | 0 | 100 HEX | 0 |

*FIG. 4*

SIGNED DIGIT MULTIPLIER

TECHNICAL FIELD OF THE INVENTION

This invention relates in general to the field of digital electronic devices. More particularly, the present invention relates to a rectangular array signed digit multiplier circuit having circuitry to support novel division, square root, binary coded decimal conversion, and transcendental function calculation through polynomial expansion.

BACKGROUND OF THE INVENTION

The arithmetic unit is one of the most important components of any integrated electronic data processing system. Arithmetic units perform a wide variety of mathematical functions upon operands which are transmitted from other portions of an integrated system. Most present arithmetic units perform the required mathematical function using methods which require only addition, subtraction and shifting operations. These methods are more time consuming than methods which require the more complicated multiplication, division and square root functions.

Implementation of arithmetic units using full precision array multipliers allow for the use of the faster methods which include multiplications and divisions. However, full precision array multipliers are large complex devices which use valuable semiconductor surface area. In addition, array multipliers which use operands which are in non-redundant format are inherently slow due to the carry propagation problems within the adder trees contained in the multiplier implementations.

Accordingly, a need has arisen for a multiplier circuit which allows for the implementation of complex methods to calculate various mathematical functions. A further need has arisen for a multiplier circuit which is fast but efficiently uses a minimum of semiconductor surface area.

SUMMARY OF THE INVENTION

In accordance with the present invention, a multiplier circuit is provided which comprises a multiplier core having a rectangular aspect ratio (that is, a multiplier circuit for multiplying operands applied to its inputs having unequal numbers of bits). In addition, the multiplier core accepts signed digit operands at one of its inputs. The multiplier core also contains two additional adder ports which facilitate the multiplication and addition of operands within a single operation cycle.

An important technical advantage of the present invention inheres in the fact that the rectangular aspect ratio of the multiplier core is uniquely suited to support a novel method of performing the division and square root functions. Additionally, circuitry is included in the multiplier of the present invention to support binary coded decimal conversion and the calculation of transcendental functions using polynomial expansion.

An additional technical advantage of the multiplier circuit of the present invention inheres in the fact that it uses signed digit representation of one of its operands. Accordingly, the problem inherent in prior art multiplier circuits resulting from carry propagation delay is eliminated. Using signed digit format there is never more than a two bit carry within the addetry of the multiplier core.

BRIEF DESCRIPTION OF THE DRAWINGS

A more complete understanding of the present invention may be acquired by referring to the Detailed Description and claims when considered in connection with the accompanying drawings in which like reference numbers indicate like features, and wherein:

DETAILED DESCRIPTION OF THE INVENTION

Top Level Circuit Description

Figure 1:
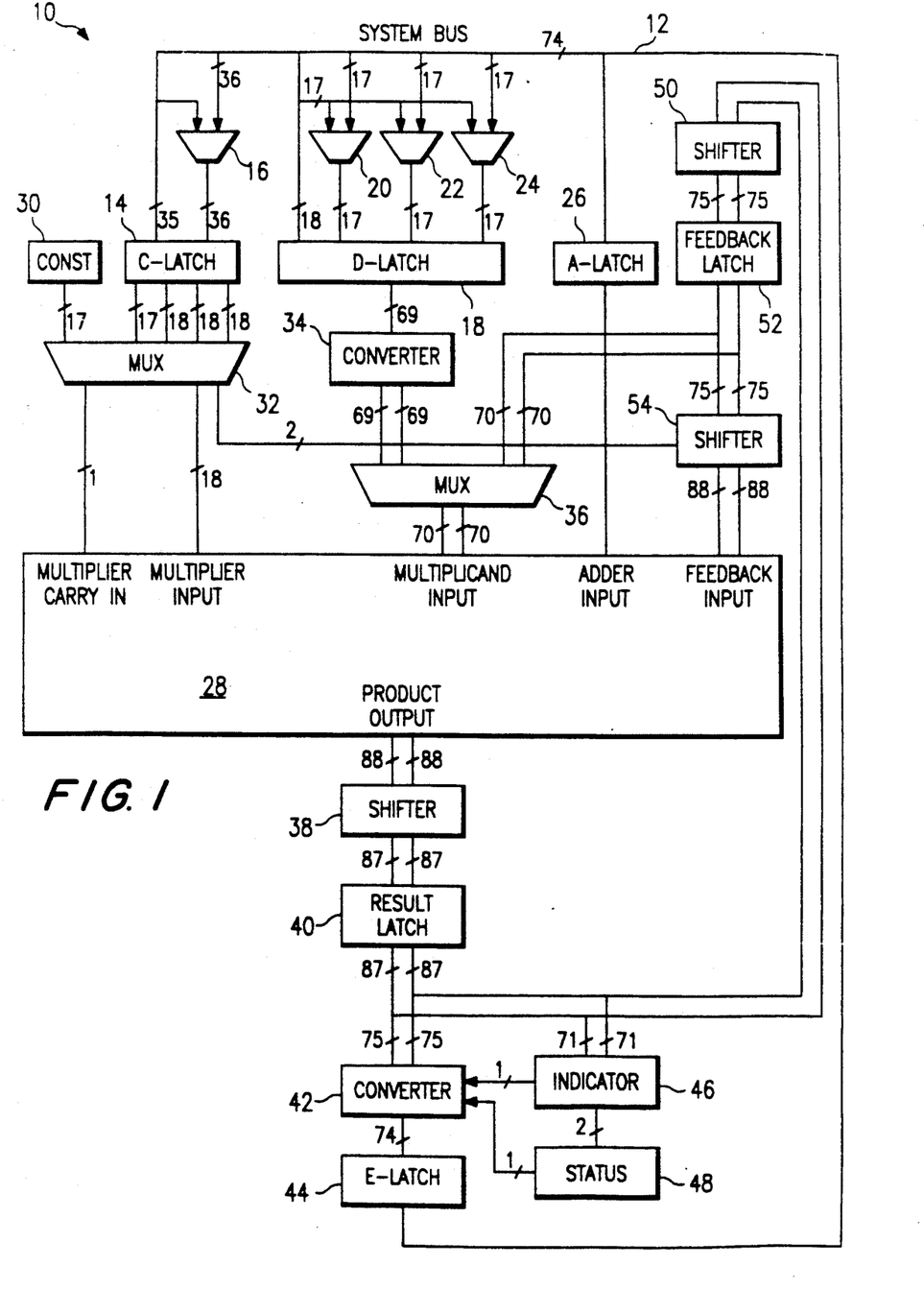
FIG. 1 is a schematic diagram of a multiplier circuit constructed according to the teachings of the present invention.

FIG. 1 is a schematic diagram of a multiplier circuit indicated generally at 10 which is constructed according to the teachings of the present invention. Circuit 10 comprises a system bus 12 which serves to allow the multiplier circuit 10 to communicate with other components (not shown) of an integrated digital data processing system. Multiplier circuit 10 may comprise, for example, a portion of an arithmetic logic unit which could be used in a microprocessor or a numeric co-processor.

System bus 12 is seventy-four bits wide and has the thirty five most significant bits coupled directly to a C-latch 14. The next most significant thirty six bits of the system bus 12 are coupled to C-latch 14 through a multiplexer 16 (MUX 16). First MUX 16 is also coupled to the most significant thirty five bits of system bus 12.

The eighteen most significant bits of system bus 12 are coupled directly to a D-latch 18. The next most significant 51 bits of system bus 12 are divided into three groups of seventeen bits each which are each respectively coupled to a second MUX 20, a third MUX 22 and a fourth MUX 24. An additional input of MUX's 20, 22 and 24 is also coupled to the seventeen most significant bits of system bus 12. The outputs of MUX's 20, 22 and 24 are coupled to three additional inputs to D-latch 18.

System bus 12 is coupled to the input of an A-latch 26. The output of A-latch 26 is coupled to an ADDER INPUT of multiplier core 28.

A constant port 30 is coupled to one input of a fifth MUX 32. Three 18-bit outputs and one 17-bit output of the C-latch 14 are coupled to four inputs of the fifth MUX 32. A single bit is input from the fifth MUX 32 to the MULTIPLIER CARRY-IN input of multiplier core 28. Eighteen bits are input from the fifth MUX 32 into the multiplier input of multiplier core 28. Two bits are output from the fifth MUX 32 to a control input of shifter 54.

Sixty-nine bits are output from the D-latch 18 into a first converter 34. Converter 34 operates to convert a non-redundant sixty-nine bit wide number into a signed digit number. Therefore, sixty-nine data bits and sixty-nine signed bits are output by first converter 34 into a sixth MUX 36. Seventy data bits and seventy signed bits are output by the sixth MUX 36 into the MULTIPLICAND INPUT of multiplier core 28.

Eighty-eight data bits and eighty-eight signed bits are output from the product output of the multiplier core 28 to a shifter 38. Shifter 38 operates to shift the result output by the multiplier core 28 to the right one or place to the left one place, or to pass the data without shifting. The most significant sign bit and data bit are truncated after appropriate correction. The remaining eighty-seven data bits and eighty-seven signed bits are output by shifter 38 into a result latch 40. The eighty-seven data bits and eighty-seven signed bits are stored in result latch 40 and are output to three separate locations. The seventy-five most significant data bits and the seventy-five most significant signed bits are output to a second converter 42. Second converter 42 converts the signed digit number at its inputs into a 74-bit number in non-redundant format and outputs this number to an E-latch 44. The E-latch 44 is coupled to the system bus 12.

The seventy-one least significant data bits and the seventy-one least significant signed bits output by the result latch 40 are input into an indicator 46. The indicator 46 is coupled to the converter 42 and to a status block 48. The eighty-seven data bits and eighty-seven signed bits output by the result latch 40 are input into a shifter 50. The output of shifter 50 is coupled to a feedback latch 52. The output of the feedback latch is coupled to a shifter 54. The output of the shifter 54 comprises eighty-eight data bits and eighty-eight signed bits and is coupled to the FEEDBACK INPUT of the multiplier core 28. Seventy data bits and seventy signed bits output by the feedback latch 52 are also input into sixth MUX 36 such that they may be selectively input into the MULTIPLICAND INPUT of multiplier core 28.

Figure 2:
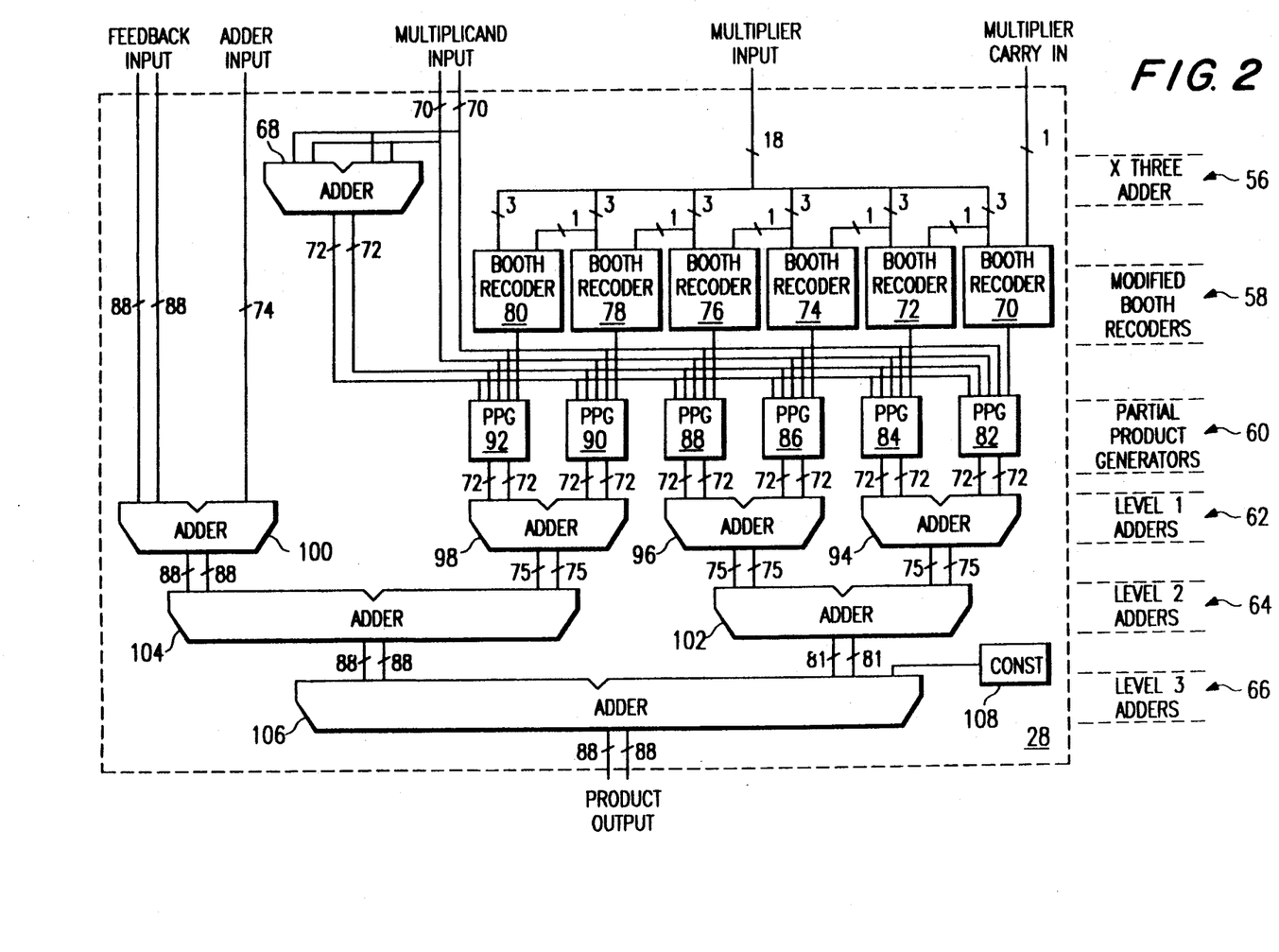
FIG. 2 is a schematic diagram of the multiplier core of a multiplier circuit constructed according to the teachings of the present invention.

Multiplier core 28 is shown in greater detail in the schematic diagram illustrated in FIG. 2. Generally, multiplier core 28 comprises a series connection of a times-three adder level indicated generally at 56, a booth recoder level indicated generally at 58, a partial product generator level indicated generally at 60, and three levels of adders indicated generally at 62, 64 and 66.

The seventy data bits and seventy signed bits of the MULTIPLICAND INPUT are input into a times-three adder 68 which comprises times-three adder level 56. Times-three adder 68 is operable to add in the multiples of three into the partial product generator level 60. Multiplication operations involving multiples of one, two and four may be accomplished using mere shift operations. However, multiples of three require adder logic which is present in the times-three adder 68.

The single bit of the MULTIPLIER CARRY-IN and the eighteen bits of the multiplier input are input in parallel to the booth recoder level 58 which comprises booth recoders 70, 72, 74, 76, 78 and 80. Each of the booth recoders 70–80 receive three bits of the multiplier from the multiplier input and are coupled to an adjoining booth recoder through a single bit carry line coupled to its input. The first booth recoder 70 has its carry-in input coupled to the single bit of the MULTIPLIER CARRY-IN input.

The output of each of the booth recoders 70 through 80 are coupled respectively to one of the partial product generators 82, 84, 86, 88, 90 and 92. The MULTIPLICAND INPUT is also coupled in parallel to each of the partial product generators 82 through 92. In addition, the output of times-three adder 68 is coupled to each of the partial product generators 82 through 92. In this manner, the booth encoded multiplier, the even multiples of the multiplicand, and the appropriately added multiples of three of the multiplicand, are all combined in the partial product generators to form the partial products to be added together to form the 88-bit product.

Accordingly, the outputs of each of the partial product generators 82 through 92 are input into three level-one adders 94, 96 and 98. In addition, a fourth level-one adder 100 has as its input the seventy-four bit ADDER INPUT and the eighty-eight signed and data bit input of the FEEDBACK INPUT. The fourth level-one adder 100 helps to illustrate an important technical advantage of the array multiplier of the present invention.

Because of the ability to access the adder tree formed by the level-one adder 62, the level-two adder 64 and the level-three adder 66, the array multiplier of the present invention is able to perform operations of the form $AX+B+C$, where A is the 18-bit multiplier, X can be a seventy bit signed digit multiplicand, B can be a 74-bit non-redundant number and C can be a 70-bit signed digit number.

The outputs of the level-one adders 94 and 96 comprise seventy-five data bits and seventy-five signed bits each, and are input into a first level-two adder 102. The output of level-one adder 98 comprises seventy-five data bits and seventy-five signed bits and is input into one side of a second level-two adder 104. The output of fourth level-one adder 100 comprises eighty-eight signed bits and eighty-eight data bits, and is input into the remaining side of second level to adder 104.

The output of first level to adder 102 comprises eighty-one signed bits and eighty-one data bits, which are input into a first side of a level-three adder 106. Also input into the first side of level-three adder 106 are two bits which are input from a constant port 108. The output of second level to adder 104 comprises eighty-eight signed bits and eighty-eight data bits which are input into a second side of level three adder 106. The output of level three adder 106 comprises eighty-eight signed bits and eighty-eight data bits and comprises the final product output which is output by the multiplier core 28 to the shifter 38 which was shown in FIG. 1. In operation, the C-latch 14 generally contains the multiplier of a multiplication operation. The D-latch 18 generally contains the multiplicand. The product of the multiplication operation is generally contained in the E-latch 44. The feedback latch 52 is used to contain the output of the multiplier core 28 in signed digit format so that it may be used in subsequent multiplication operations.

Most data transfers to and from the multiplier circuit 10 are across the seventy-five bit wide system bus 12. For example, the C-latch 14 and the D-latch 18 are both loaded from the system bus 12. It should be understood that FIGS. 1 and 2 are schematic illustrations showing the paths through the multiplier circuit 10. For the purposes of clarity, the control paths used to operate the multiplier circuit 10 have not been shown. It should be understood that suitable timing and control signals are input into the necessary components of multiplier circuit 10 to insure the appropriate and efficient operation of its component parts.

Signed Digit Arithmetic

The signed digit notation used in the multiplier circuit 10 uses a digit set comprising −1, 0 and 1. These digits are defined by a sign bit and a data bit according to the following table:

| Sign | Data | Value |
|------|------|-------|
| 0 | 0 | 0 |
| 0 | 1 | 1 |
| 1 | 1 | −1 |

A high sign bit and a low data bit which would comprise a "−0" is not an allowed condition.

Figure 3:
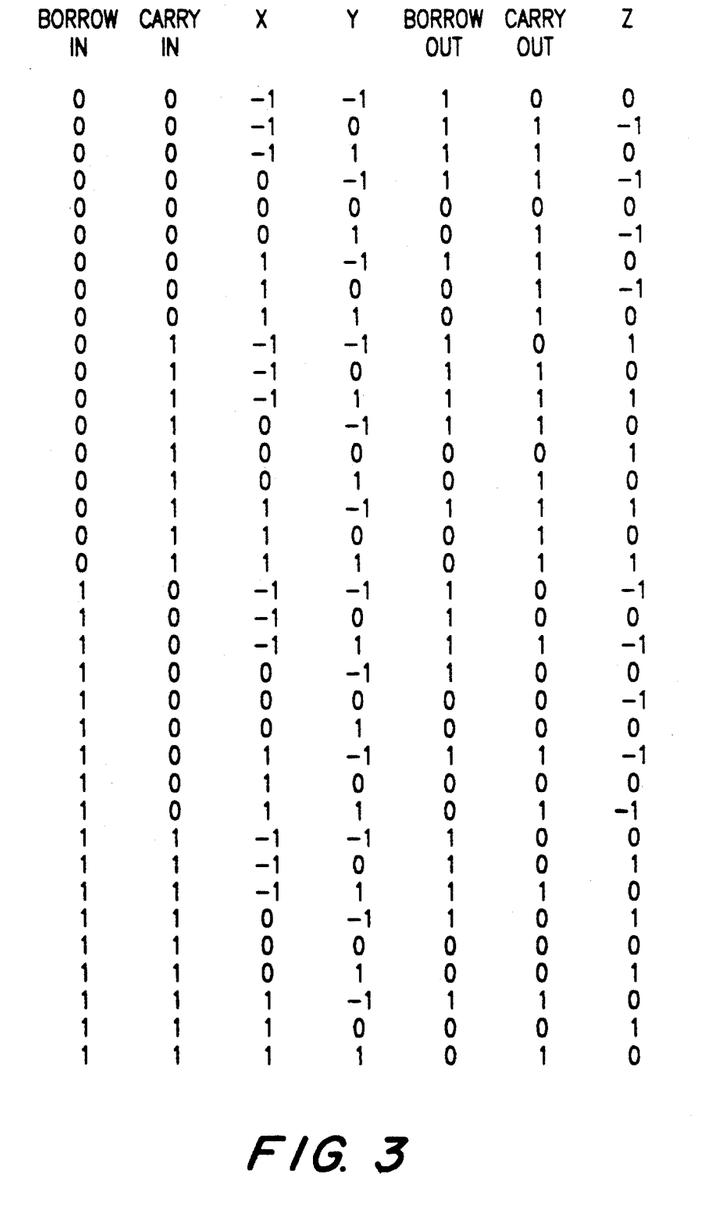
FIG. 3 illustrates in tabular form a truth table which shows the addition of an operand X to an operand Y to produce a sum Z.

The basic signed digit adder used in the three levels of adders 62, 64 and 66 used in multiplier core 28, each accept two signed digit numbers, a carry-in and a borrow-in. Each adder reduces these inputs to a single signed digit number, a carry-out and a borrow-out. FIG. 3 illustrates in tabular form a truth table which shows the addition of an operand X to an operand Y to produce a sum Z. The values for the borrow-in, carry-in, borrow-out and carry-out are also shown.

The speed of an adder circuit is normally limited by the propagation of the carry signal from one bit to the next. This is because the carry-out signal from one bit of an adder is dependent on the carry-in to that adder. Prior art advances in adder circuits generally have to do with shortening this path by such means as carry-look-ahead or carry-select circuits. Because of the novel structure of the multiplier circuit of the present invention, it can be seen in the truth table shown in FIG. 3 that the borrow-out is independent of the borrow-in. In addition, the carry-out signal may be affected by the borrow-in, but is independent of the carry-in. This results in the fact that the borrow or carry is never propagated more than two bits.

An important consideration of the signed digit adder associated with the truth table shown in FIG. 3 is that the redundancy of the digit set allows carries and borrows to be generated when they are not required. This is generally not a concern unless it happens on the most significant bit of a number when it causes the generation of "leading ones". Leading ones always take the form of one of either sign followed by one or more ones of the of opposite sign. Leading ones exist on the most significant end of a signed digit number which when converted to non-redundant form, become leading zeroes. Unlike leading zeroes, however, leading ones cannot simply be truncated. Since the sign of the most significant one determines the sign of the number, truncating leading ones could result in a new number whose most significant one was of the opposite sign. Using appropriate logic, the multiplier circuit of the present invention allows for leading ones to be truncated. Numbers that must be truncated on the most significant end require an extra bit which is somewhat analogous to a signed bit in twos complement notation. This extra bit is referred to as the overflow bit.

Additionally, the adders used in the multiplier circuit 10 are sufficiently wide such that the data being added does not require the generation of a borrow or carry. However, since the data format is redundant, the truth table shown in FIG. 3 can produce borrows and carries when they are not required. The two cases where this is possible are when a carry is produced and the value for Z is equal to −1. Or when a borrow is produced and the value for Z is equal to 1. These outputs would result in the creation of leading ones. In order to prevent this from occurring, the truth table for the most significant bit of each adder is slightly modified. The changes are illustrated in the following truth table.

| Borrow-In | Carry-In | X | Y | Z |
|-----------|----------|----|----|----|
| 0 | 0 | 0 | 1 | 1 |
| 0 | 0 | 1 | 0 | 1 |
| 0 | 1 | −1 | −1 | −1 |
| 1 | 0 | 1 | 1 | 1 |
| 1 | 1 | −1 | 0 | −1 |
| 1 | 1 | 0 | −1 | −1 |

Any non-redundant number of a given number of bits in length may have an unlimited number of bits when expressed in non-redundant format since there can be an unlimited number of leading ones. This conversion is shown in symbolic notation as follows:

$$n_x \ldots n_3, n_2, n_1, n_0 = \ldots r_{x+2}, r_{x+}, r_x \ldots r_3, r_2, r_1, r_0$$

This generation of leading ones can present a problem when trying to truncate leading bits from a number. The redundant number can easily be truncated to $x+1$ bits with the following correction: if $r_{x+2}=0$, then invert the sign of $r_x$ which results in $n_x \ldots n_3, n_2, n_1, n_0 = r_{x+1}, r_x \ldots r_3, r_2, r_1, r_0$ Thus, the entire string of bits more significant than bit $x+1$ is reduced through this conversion to a single bit $x+1$ called the overflow bit. The overflow bit must be included in the data path of the multiplier circuit of the present invention in order to provide for the truncation of leading bits.

An additional consideration results when it is necessary to not merely truncate leading bits of a signed digit number, but actually separate the signed digit number into a most significant portion and a least significant portion without affecting the accuracy of each portion or incurring the speed penalties incurred in a conversion of the entire bit string to non-redundant format. This procedure may occur, for example, in the conversion of a real number to a binary coded decimal (BCD) number which will be discussed herein and where each BCD digit is resident in the most significant portion of a bit string during the conversion process. The additional consideration inheres in the fact that the least significant portion may require a borrow into the most significant portion, affecting the values in each portion. The least significant portion may be converted using the overflow bit described above. The most significant portion may be converted by determining the sign of the least significant portion and if negative, decrementing the most significant portion.

Top Level Description of Functionality

C-latch 14 is seventy-one bits wide and is loaded from the system bus 12. It can be loaded in three ways. The entire register can be loaded from the most significant portion of the system bus 12. Secondly, the most significant thirty-five bits can be independently loaded from the most significant part of the system bus 12. Finally, the least significant thirty-six bits of the C-latch 14 can be loaded independently from the most significant part of the system bus 12. The C-latch 14 is divided into quadrants so it can drive the short side of the multiplier core 28. The fourth quadrant, which is the most significant quadrant of the C-latch 14 is seventeen bits, which is one bit shorter than the remaining which are each eighteen bits in width.

The fifth MUX 32 selects from various bits of the C-latch 14 or from the constant generator 30 to drive the multiplier input and the multiplier carry in input of the multiplier core 28. It also provides a control input to shifter 54 which is used in a special 19 bit wide multiply that will be discussed herein.

Figure 4:
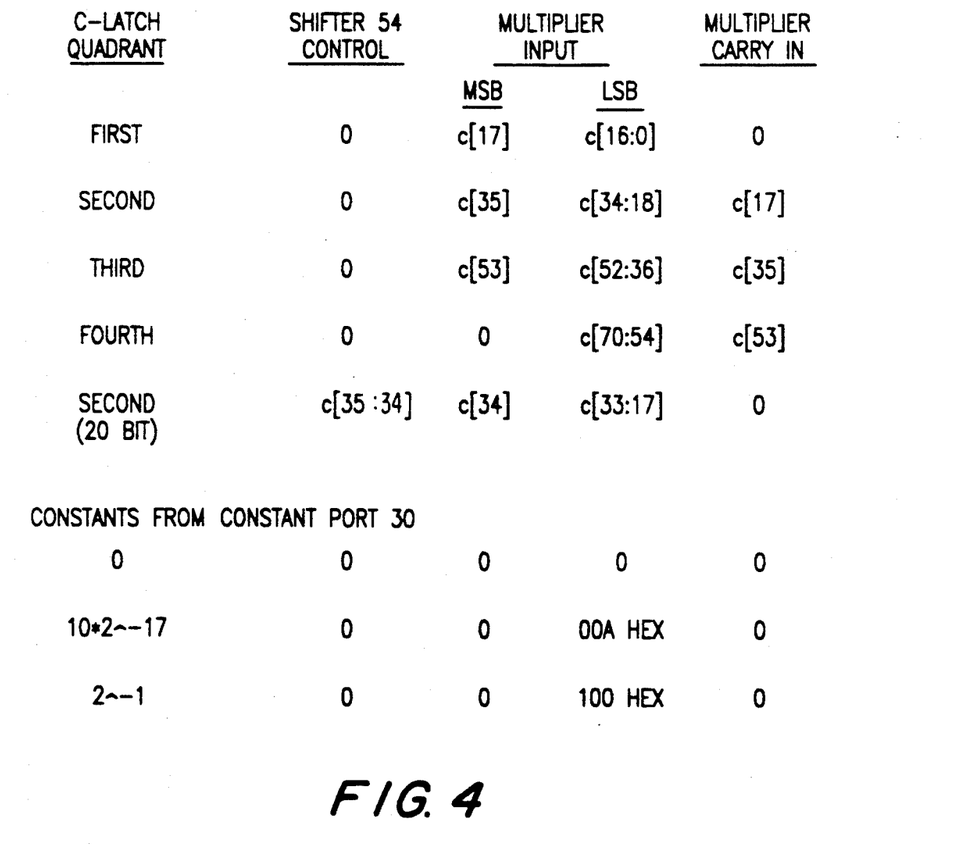
FIG. 4 is a tabular illustration of the operation of a particular portion of the multiplier circuit of the present invention.

FIG. 4 is a tabular description of MUX 32. MUX 32 selects from five different combinations of the C-latch 14 or three different constant values. Shifter 54 control is used during the 20 bit multiplies. MULTIPLIER INPUT and MULTIPLIER CARRY-IN are inputs to the multiplier core 28. In FIG. 4, the notation c[16:0] stands for the range of bits from 16 through 0 of the C-latch 14, obeying the least significant bit.

The D-latch 18 is sixty-nine bits wide and is divided into quadrants. The D-latch can be loaded in four different ways. The entire D-latch may be loaded with the most significant bits of the system bus 12 or each of the three least significant quadrants of the D-latch may be independently loaded with the seventeen most significant bits of the system bus 12.

The converter 34 converts the non-redundant value in the D-latch into a signed digit number by appending a sign bit to each data bit. The sign bits can all be set to 0 corresponding to a positive number or all set to 1 corresponding to a negative number. Additionally, each of the three least significant quadrants independently can be set negative while the remaining quadrants are positive.

The long side of the multiplier core 28 is driven by the sixth MUX 36. Sixth MUX 36 selects between seventy bits input from the feedback latch 52 in signed digit format, or sixty-nine bits input by the converter 34. If the data from the converter 34 is selected, the most significant bit or over flow bit is set to zero. The entire contents of the D-latch 18 or any of the four quadrants of the D-latch 18 can be negated as required.

The output of the multiplier core passes through a shifter 38 which is capable of shifting the product left or right by one or passing the product through unshifted. After passing through shifter 38, the most significant bit of the product is truncated and the product is loaded into the result latch 40. Data from the result latch 40 may be optionally shifted left seventeen bits by shifter 50 as it is loaded into the feedback latch 52. The output of the feedback latch 52 may be conditionally negated. The output of the feedback latch 52 may drive the long side of the multiplier core 28 through the sixth MUX 36 or may be input into the FEEDBACK INPUT of the multiplier 28 through shifter 54. Shifter 54 can pass data through unshifted, shift left by one or two, or shift right by 18-bit positions.

The operations of shifting left by one or two bit positions are only performed by shifter 54 when it is known from the operations being performed that the one or two most significant data bits of the data paths are not occupied by significant data. The shift right by 18 operation is used for purposes of aligning portions of a product during multiplication operations which will be described herein.

The indicator 46 determines the sign and magnitude of certain fields of the eighty-seven bits output by the result latch 40. During a multiplication operation, the indicator 46 keeps track of the least significant bits of the product to determine if any bits are thrown away and, if so, the sign of the discarded number. The indicator 46 is operable to determine the sign of a least significant portion of the data path during the separation of the data bits into two portions during real to BCD conversion as discussed previously. The indicator 46 functions to set the overflow bit if the least significant portion of the data path is negative. During division and square root operations, the indicator 46 determines whether a remainder value is non-zero and if non-zero, whether it is positive or negative. This information is stored by indicator 46 in a status block 48. Status block 48 is also coupled to remaining components of the system through control lines (not shown) and to the converter 42. The status block 48 communicates to the converter 42 whether a large radix digit value has been determined to be positive or negative such that the converter 42 may appropriately complement the non-redundant representation of the value prior to loading it in the E-latch 44 as required by the division and square root operations discussed herein.

The converter 42 receives a positive or negative signed digit value from the most significant seventy-five bits output by the result latch 40, along with the sign and indicator bits from the indicator 46, and converts this data to a positive 74-bit non-redundant number. This number is conditionally stored in the 74-bit- E-latch 44 with the indicator bit in the least significant location. An important feature of the present invention inheres in the capability of converter 42 to detect a maximum value output by result latch 40 indicating an overflow out of the data path. Converter 42 is operable to saturate the value output to E-latch 44 if an overflow is present after conversion of the maximum value to non-redundant format. The output of the E-latch 44 is coupled to the system bus 12. The E-latch 44 is operable to output to the system bus 12 either a full 74 bit value or a truncated 17 bit large radix digit value as required by operations discussed herein.

Referring to FIG. 2, each of partial product generators 82 through 92 are radix eight with modified Booth recoding capability. Accordingly, each partial product generator is capable of producing between −4 and +4 times a multiplicand. Each of Booth recoder circuits 70 through 80 require four bits of the multiplier. The eighteen bits of the MULTIPLIER INPUT are divided equally three bits to each of the six recoders 70 through 80. In addition, there is a one bit overlap between adjacent recoders which provide the fourth bit input into each recoder. Thus, each of recoder circuits 70 through 80 are coupled to three respective bits of the MULTIPLIER INPUT and to the most significant bit of an adjacent lesser significant recoder circuit. Modified Booth recoder circuit 70 is the least significant recoder circuit, and is accordingly coupled to the three least significant bits of the MULTIPLIER INPUT and the single bit of the MULTIPLIER CARRY-IN INPUT.

The following truth table describes the recoding of the multiplier bits into the modified Booth format as they are input to each of the partial product generators through 92.

| Multiplier | Carry-In | Modified Booth Recoder Output |
|---|---|---|
| 000 | 0 | 0 |
| 000 | 1 | 1 |
| 001 | 0 | 1 |
| 001 | 1 | 2 |
| 010 | 0 | 2 |
| 010 | 1 | 3 |
| 011 | 0 | 3 |

-continued

| Multiplier | Carry-In | Modified Booth Recoder Output |
|---|---|---|
| 011 | 1 | 4 |
| 100 | 0 | −4 |
| 100 | 1 | −3 |
| 101 | 0 | −3 |
| 101 | 1 | −2 |
| 110 | 0 | −2 |
| 110 | 1 | −1 |
| 111 | 0 | −1 |
| 111 | 1 | 0 |

Within each partial product generator 82 through 92, multiplying by one, two or four is simply accomplished by shifting the multiplicand. Multiplying by three is accomplished by the times three adder 68 which adds one times the multiplicand to two times the multiplicand. The output of adder 68 is input to all of the partial product generators 82 through 92. In this manner, one, two, three and four times the multiplicand is available at the inputs of each of the partial product generators 82 through 92.

Because signed digit notation is used, the negation of a value to be output by each of partial product generators 82 through 92 is simple. Negation of a number is accomplished by inverting each sign bit which has a corresponding data bit which is a one. Thus, each partial product generator has at its inputs the multiplicand and three times the multiplicand and is operable to select one, two, three or four times the multiplicand and selectively negate the output to provide the full range of +4 to −4 times the multiplicand.

The outputs of the partial product generators 82 through 92 are seventy-two bits wide. Each of the level one adders 94, 96 and 98 add the output of two partial product generators offset by three. The outputs of level one adders 94, 96 and 98 are seventy five bits wide. The level one adder 100 adds the ADDER INPUT to the FEEDBACK INPUT with the most significant bits aligned. Level two adder 102 adds the outputs of level one adders 94 and 96. The outputs of level one adders 94 and 96 are offset by six, and the output of level two adder 102 is eighty-one bits wide. Level two adder 104 adds the outputs of level one adders 98 and 100 with their most significant bits aligned. The output of level two adder 104 is eighty-eight bits wide. The two level two adders 102 and 104 are added together in the level three adder 106 with their least significant bits aligned. The constant port 108 can generate the constants two and three halves which can also be added in the level three adder 106, as required by Newton-Raphson approximation methods used in the division and square root operations as described herein. The final product of the multiplier core 28 is output by the level three adder 106 and is eighty-eight bits wide.

Multiplication

In operation, a full precision multiplication operation is accomplished in four passes through the multiplier core 28 followed by a conversion cycle. The input operands are loaded from the system bus 12. A sixty-nine bit multiplicand is loaded into the D-latch 18 and a seventy-one bit multiplier is loaded into the C-latch 14. Both input operands are in non-redundant format. The A-latch 26 and the feedback latch 52 are both cleared.

In the first pass, the least significant eighteen bits of the multiplier are selected by multiplexer 32 and pass to the multiplier input of the multiplier core 28. Multiplexer 32 initially sets the MULTIPLIER CARRY-IN INPUT to zero. The multiplicand in the D-latch 18 is converted into a signed digit number in the converter 34 by setting all the sign bits of the multiplicand to zero. This value is selected by multiplexer 36 which appends a zero to the most significant end. The resulting seventy bits signed digit number then becomes the MULTIPLICAND INPUT to the multiplier core 28. The MULTIPLICAND INPUT remains unchanged to the rest of the multiplication procedure. Since the A-latch 26 and the feedback latch 52 are cleared, the ADDER INPUT and the FEEDBACK INPUT to the multiplier core 28 are zero. The shifter 38 truncates the most significant bit of the 88-bit product output by the multiplier core 28 which is guaranteed to have a non-significant value by the modified Booth recoding performed in multiplier core 28 and outputs the resulting eighty-seven bit signed digit number to the result latch 40. The result latch 40 then contains the partial product, the seventy-five most significant bits of which are then sent to the feedback latch 52 and the least significant eighteen bits of which are sent to the indicator 46. The output of the feedback latch 52 is shifted right eighteen places in shifter 54 and passed to the FEEDBACK INPUT of the multiplier core 28. Only the most significant seventy-five bits of the partial product are latched into feedback latch 52. The twelve least significant bits of the partial product are truncated during the loading of feedback latch 52. Six additional bits are lost during the 18 bit right shift operation performed by shifter 54. These eighteen bits stored in the result latch 40 which are not returned to the FEEDBACK INPUT are read by the indicator 46. The indicator 46 comprises a sign and a zero latch that record if the 18 truncated bits are zero, and the sign of a non-zero value.

In the second and third passes, the second and third least significant eighteen bits of the multiplier are selected respectively by multiplexer 32 and passed to the multiplier input of the multiplier core 28. The MULTIPLIER CARRY-IN is set equal to the most significant bit of the previous quadrant of the C-latch 14. The MULTIPLICAND INPUT and the ADDER INPUT remain unchanged. The FEEDBACK INPUT contains the partial product from the previous pass shifted right by eighteen to properly align it. The most significant part of the new partial product is stored in the feedback latch 52. The least significant eighteen bits are checked by the indicator 46. If any ones are set in the eighteen bits that are passed to the indicator 46, the sign latches are updated appropriately or else the old values of these latches are retained.

The fourth pass to the multiplier core 28 is similar to the previous passes with the most significant seventeen bits of the multiplier being selected by the multiplexer 32. The final segment of the multiplier is a 17-bit value allowing the most significant bit of the multiplier input to be set to zero. As the final product is present in result latch 40, the most significant seventy-five bits of the result latch 40 are sent to the converter 42. The remaining twelve bits are input to the indicator 46 which updates the zero and sign latches contained therein. The resulting value of the sign latch is passed to the converter 42. The converter 42 converts the signed digit result into a non-redundant format. If the indicator 46 has truncated a negative number, this result is decremented by one. After the seventy-five bit number has been converted, the most significant bit will always be equal to zero. The remaining seventy-four bits are latched in the E-latch 44 such that the result may be read across the system through the system bus 12. The remaining system can also read the final value of the zero latch contained in the indicator 46 which indicates whether any bits were truncated, and therefore, whether the result is precise.

Division Operation Specific Hardware

The multiplier circuitry is also extremely useful in performing a novel method of division which is described in full in Applicants' co-pending application "Method and Apparatus for Performing Division Using a Rectangular Aspect Ratio Multiplier", Ser. No. 07/389,051, filed Aug. 2, 1989. The following hardware was added to the multiplier circuit 10 to efficiently divide using the aforementioned method.

The first part of the divide operation uses the Newton-Raphson method of reciprocal evaluation. This method starts with the seed value from a look-up table and iterates that value with the following equation until the desired accuracy is required.

$$y'' = y'(2yy')$$

where, y'' = new value of reciprocal
y' = old value of reciprocal; and
y = divisor.

The equation is evaluated with two passes through the multiplier core 28. The divisor is loaded into the D-latch 18. The seed value of the reciprocal is loaded into the C-latch 14. When the value in the D-latch 18 is converted to signed digit notation in converter 34, it is negated. The constant generator 108 adds in a constant two into the level three adder 106. The product of the first pass is equal to (2-yy'). The most significant seventy-five bits of this product are stored in the feedback latch 52. The second pass through the multiplier core 28 multiplies the result of the first pass times the starting approximation of the reciprocal.

Because the multiplier 28 can accept the MULTIPLICAND INPUT in signed digit format, a conversion to non-redundant format is not required, and the two passes through the multiplier core 28 can be on back to back clock cycles. On the second pass through multiplier core 28, the multiplier input remains constant while multiplexer 36 selects the feedback latch 52 to supply the MULTIPLICAND INPUT.

The approximate reciprocal is then iterated an additional time using two additional passes through multiplier core 28. On the final pass through multiplier core 28, a reciprocal bias adjustment factor is added through the A-latch 26 and the ADDER INPUT.

The division algorithm requires a multiplication by a nineteen bit reciprocal value to have enough accuracy to calculate the 17-bit quotient digit value. Because a small reciprocal bias adjustment factor is added to the reciprocal to guarantee that it is never too small, it is possible that the nineteen bit value will overflow into a twenty bit value.

The input operand to the short side of the multiplier core 28 for the nineteen or twenty bit multiply, is the field of the C-latch 14 which corresponds to the second least significant eighteen bits of the C-latch 14 shifted left by one place. The nineteen or twenty bit multiply is accomplished by using the FEEDBACK INPUT into the multiplier core 28. The eighteen least significant bits are fed to the MULTIPLIER INPUT of the multiplier core 28. The multiplicand must be loaded into the feedback latch 52. Multiplexer 36 selects the feedback latch 52 and passes it to the MULTIPLICAND INPUT. Additional copies of the multiplicand are shifted left by one or two in the shifter 54 and input into the FEEDBACK INPUT of the multiplier core 28. Because the upper and lower bounds of the reciprocal are known, the eighteenth and nineteenth bits of the aforementioned field of C-latch 14 can control the shifter 54. The following table shows all possible combinations of the twenty bit reciprocal and that there are only three possible combinations of the eighteenth and nineteenth bit.

```
010xxxxxxxxxxxxxxxxxx'
011xxxxxxxxxxxxxxxxx
100000000000000000x
```

The first eighteen bits of the multiplier go through the modified Booth recoding process in modified Booth recoders 70 through 80. Bits 19 and 20 are accounted for with the FEEDBACK INPUT to the multiplier core 28. The setting of the eighteenth bit requires an addition of one times the multiplicand through the FEEDBACK INPUT because the MULTIPLIER INPUT is encoded using a modified Booth's algorithm and setting the eighteenth bit normally causes the multiplier core 28 to output a negative number. During a typical full precision multiplication operation, the negative value is corrected on the next pass through the multiplier core 28 by incrementing the MULTIPLIER INPUT and thereby adding in the multiplicand one additional time. However, in this case, there is no second pass through the multiplier core 28 so the correction is accomplished with the multiplicand added through the FEEDBACK INPUT.

All the possible combinations of bits 18, 19 and 20 are shown below along with the number of times the multiplicand must be added in the FEEDBACK INPUT. Since only one and two times the multiplicand is required, the hardware required to generate the number is only shifter 54. It can also be seen from the following table that bits 18 and 19 are all that is required to control the operation of shifter 54.

| BIT # | | | |
|---|---|---|---|
| 20 | 19 | 18 | Number to be Added |
| 0 | 1 | 0 | 1 times the multiplicand |
| 0 | 1 | 1 | 2 times the multiplicand |
| 1 | 0 | 0 | 2 times the multiplicand |

The data path width required for these operations is not at all obvious. It is important to understand the data path width required by a normal multiplication operation performed using multiplier circuit 10. Signed digit representation of a number requires a single overflow bit to be appended to the data path. This single bit is truncated when the result is converted to a non-redundant number. For the purpose of this discussion, the over flow bit will not be counted in the data path width. The process of modified Booth recoding centers the product about zero so that the magnitude of the product of a modified Booth recoded multiplier is one bit smaller than a normal multiplier. This bit is traded for a sign bit. This also implies that the product needs to be corrected on a subsequent cycle. In the multiplier circuit of the present invention, if the short side input is eighteen bits, it produces a signed partial product and a carry bit which can be corrected on a subsequent cycle. On the final pass through multiplier core 28 during a full precision multiplication operation, the multiplier is normally limited to seventeen bits. A 17×69-bit multiply can produce an 86-bit result, which is exactly the width of the bus coupling the result latch 40 to the shifter 50.

The 20-bit multiply operation described above is accomplished without increasing the 86-bit bus to hold the result. This means that three extra bits must be accounted for. The first of the three bits is trivial. Shifter 38 always does a shift right by one place during the 20 bit multiplication operation. One bit is lost in the least significant end of the data path because of this right shift, but since this multiplication operation is only used for calculating an estimate of the quotient truncated to seventeen bits, this bit will be truncated anyway.

A second bit is dependent upon the novel division method used in conjunction with the multiplier circuit of the present invention. For example, in the division operation, the 20-bit multiply is used to calculate the 17-bit quotient digit value by multiplying the reciprocal of the divisor by the dividend or partial remainder. The dividend is always shifted right making the long side sixty-eight bits instead of sixty-nine bits, which results in a 16-bit or 17-bit quotient digit value. On subsequent passes, the partial remainder may be sixty-nine bits in width. However, the method of division is such that this only occurs when the reciprocal is small enough so that the product of the reciprocal and the partial remainder will never result in an 18-bit digit.

The argument discussed above is only valid if the quotient digit value is calculated using the exact reciprocal. It is in this manner that the third bit is explained. Because an estimate of the reciprocal is used, the rounding of that estimate may cause a quotient digit value to be slightly larger than seventeen bits. The division method is such that the actual exact value of quotient digit is never greater than seventeen bits. Therefore, the multiplier circuit of the present invention recognizes an overflow out of the multiplier, and forces the answer to be the largest possible 17-bit number using the saturation capability of converter 42 as discussed previously.

The method of division used in conjunction with the multiplier circuit of the present invention continues by loading the dividend into the D-latch 18. An appropriate constant is selected from the constant port 30 by multiplexer 32 such that the result latch 40 is equal to the dividend divided by two, which is passed through the shifter 50 and latched into the feedback latch 52. The divisor is then loaded into the D-latch 18. The short reciprocal of the divisor which was calculated in the aforementioned portion of the division method remains in the least significant half of the C-latch 14.

The first quotient digit value is calculated by multiplying the short reciprocal by the dividend in multiplier core 28 using the 20 bit multiplier operation described above. The product is latched into result latch 40 after being shifted right one bit position in shifter 38. The product is converted to non-redundant format in converter 42 and loaded into the E-latch 44. The E-latch truncates the quotient digit value to seventeen bits and places it on the system bus 12. The quotient digit value is loaded from the system bus 12 into the most significant half of the C-latch 14 without disturbing the short reciprocal value which remains in the least significant half of the C-latch 14.

The first partial remainder is then calculated. The multiplexer 32 selects the first quotient digit value from the most significant half of the C-latch 14. The converter 34 negates the divisor which is stored in the D-latch 18, which is selected by multiplexer 36 to drive the MULTIPLICAND INPUT of the multiplier core 28. The value equal to one-half the dividend is passed unchanged through shifter 54 from feedback latch 52 to drive the FEEDBACK INPUT to the multiplier core 28. The first quotient digit value is then multiplied by the negated divisor and subtracted from the dividend in multiplier core 28. This entire process occurs in a single clock cycle. The subtraction operation cancels the seventeen most significant bits of the result. The value in the result latch 40 is then shifted left by 17-bit positions and loaded into the feedback latch 52. This process is repeated using each successive partial remainder in place of the dividend in the described iteration until the desired number of quotient digit values are obtained.

It is possible for the value of the remainder to be negative. If the remainder is negative, the next quotient digit value will also be negative. However, the quotient digit value is passed to the MULTIPLIER INPUT to calculate the next remainder, and the MULTIPLIER INPUT cannot accept negative numbers. The indicator 46 determines the sign of the remainder and sets a sign status flag in the status block 48 when the remainder is negative. The converter 42 complements the quotient digit value based on the sign status flag such that the quotient digit value is always converted to a positive number. The converter 42 is also controlled by the sign status flag so that the sign of the multiplicand is always opposite the sign of the value stored in feedback latch 52 when each new remainder is calculated.

Because the reciprocal bias adjustment factor is added to the reciprocal before it is truncated, it is possible for the quotient digit value to overflow into an 18-bit number. Since it is known the characteristics of the division method that the quotient digit value is always less than an 18-bit value, an overflow into an 18-bit number is detected in the converter 42 and is replaced by the largest possible 17-bit number as discussed previously.

Square Root Operation Specific Hardware

The multiplier of the present invention can also be used in conjunction with a novel method of performing the square root function which is fully described in Applicants' co-pending application, "Method and Apparatus for Performing the Square Root Function Using a Rectangular Aspect Ratio Multiplier", Ser. No. 07/402,822, filed Jun. 7, 1990.

Essentially, the method of performing the square root function used in conjunction with the multiplier of the present invention is very similar to the method described above for performing the division function. However, there are some features of the multiplier circuit 10 which are used in the square root function which are not used in the division function. For example, the multiplier circuit 10 must have the ability to selectively negate each root digit value as it is calculated. This is accomplished by the sub-division of the D-latch 18 into four quadrants, the most significant quadrant being eighteen bits in width and the remaining three quadrants being seventeen bits in width.

The method of performing the square root function used in conjunction with multiplier circuit 10 uses a modified Newton-Raphson approximation to iteratively generate an approximation of the reciprocal of the square root of the operand. The equations iterated are given as follows:

$$y'' = y'(3/2 - y/2(y')^2)$$

where,
- $y''$ = the new value of the reciprocal,
- $y'$ = the old value of the reciprocal, and
- $y$ = the operand for operands having even exponents; and $$y'' = y'(3/2 - y(y')2)$$

where,
- $y''$ = the new value of the reciprocal,
- $y'$ = the old value of the reciprocal, and
- $y$ = one-half of the operand for operands having odd exponents.

Each iteration of the above equations are evaluated with three passes through the multiplier core 28 and two iterations are required such that the value of the reciprocal may be generated with six passes through multiplier core 28. Prior to the first pass, a seed value for the reciprocal is loaded from a look-up table (not shown) through system bus 12 into the C-latch 14. The operand is loaded initially in the D-latch 18.

For the first pass of the first iteration, the MUX 36 selects the operand stored in D-latch 18 and inputs it through the MULTIPLICAND INPUT into multiplier core 28. The reciprocal seed value is input from the C-latch 14 through the MUX 32 into the MULTIPLIER INPUT of multiplier core 28. Multiplier core 28 then forms the product of the seed value and the operand corresponding to y·y' or y/2·y' in the above equations. This product is then loaded into feedback latch 52. The division by two for even exponents is performed by a shift right by one place in shifter 38.

On the second pass, the prior product present in the feedback latch 52 is again multiplied by the seed value stored in C-latch 14. During the formation of this product, the product is negated and added to the constant three-halves output from constant port 108 in adder 106 to form the $(3/2 - y(y')^2)$ $(3/2 - y/2(y')^2$ terms of the above equations. This term is then loaded into the feedback latch 52.

The third pass through multiplier core 28 completes the iteration by forming the product of the seed value stored in C-latch 14 and the value stored in feedback latch 52. This final product is then converted in converter 42 and loaded in C-latch 14. The operand remains in the D-latch feedback latch 52 and the circuit 10 is thereby initialized for an additional iteration of the above-described equations.

On the final pass through multiplier core 28 during the second iteration of the above equations, a reciprocal bias adjustment factor is added to the value for the reciprocal to guarantee that, when used to generate root digit values, the reciprocal value will always produce the exact value of the root digits or a value that is one unit in the last place too large. Shifter 38 performs a shift left by one bit position to allow for the maximum number of significant data bits in the data path, the most significant data bit being expendable due to the normalization of the operand and reciprocal values. The final value of the reciprocal is converted to nonredundant format in converter 42 and the most significant bits are loaded into the least significant half of C-latch 14 via E-latch 44 and system bus 12. During the conversion of the reciprocal, the operand is multiplied by the constant one-half output by constant port 30 and shifter 38 performs a shift right by one place for even exponents and performs a no shift for odd exponents. The value output from shifter 38 is then loaded into feedback latch 52 and is equal to the value for one-half the operand for odd exponents and equal to one quarter the operand for even exponents.

An additional requirement of the square root method used in conjunction with the multiplier circuit of the present invention is that the previously calculated root digit value must be used in the later calculations. The previous root digit value exists in the most significant seventeen bits of the system bus 12 after its calculation. This root digit value must be able to be loaded into any of the quadrants of D-latch 18. Hence, circuit 10 comprises multiplexers 20, 22 and 24 which allow for this selective loading. Additionally, as discussed previously, each of the quadrants of the D-latch 18 can be negated if the sign latch within the status block 48 indicated a negative remainder indicating a negative digit.

A further requirement of the square root method is the ability to selectively add in digit bias adjustment factors to the product output by multiplier core 28 prior to the step of truncation which creates each root digit value. These correction factors are input through the A-latch 26 into the ADDER INPUT of multiplier core 28 such that their addition does not incur any further clock cycles than are otherwise necessary for the square root method.

Binary Coded Decimal Conversion Operation Specific Hardware

Additional operations which may be performed efficiently in multiplier circuit 10 are the conversion of binary coded decimal numbers to real numbers and the conversion of real numbers to binary coded decimal numbers. The only portion of the BCD to real conversion method which has not been discussed, is the capability of the constant port 30 to generate and input into multiplexer 32 the constant 10 x 2-17. In order to understand why the multiplier circuit 10 is useful for BCD to real conversion, the nature of this operation must first be examined. An exemplary decimal number rewritten as follows:

$$\sum_{i=0}^{4} d_i \times 10^i$$

may be rewritten as the expansion:

$$(d_4 \cdot 10^{-4}) + (d_3 \cdot 10^3) + (d_2 \cdot 10^2) + (d_1 \cdot 10^1) + (d_0 19 \ 10^0)$$

Rearranging the above using Horner's Rule, the following:

$$((((d_4) \cdot 10 + d_3) \cdot 10 + d_2) \cdot 10 + d_1) \cdot 10 + d_0$$

In the above form, it is easy to see that the conversion from binary coded decimal to real format can be accomplished with a multiplication by ten followed by an addition for each digit. Since the multiplier circuit 10 can perform an addition operation and a multiplication operation in a single clock cycle, the majority of an 18-digit BCD to real conversion can be accomplished in eighteen clock cycles.

Multiplexer 32 outputs a constant multiplier of $10 \times 2^{-17}$ from constant port 30. Shifter 38 multiplies the product output by multiplier core 28 by $2^{17}$ as it loads the result into feedback latch 52.

To accomplish the conversion, the multiplier circuit 10 is supplied with one BCD digit at a time on the most significant four bits of the system bus 12. These bits are loaded into the A-latch 26. These bits are aligned in the A-latch 26 such that the least significant bit of the final result is loaded onto the system bus 12 sixty-four bits from the most significant bit position.

In the first clock cycle of the conversion process, the first digit is loaded into the A-latch 26. It is passed unchanged through the multiplier core 28 and shifted left 17-bit positions in shifter 38 prior to being loaded into the feedback latch 52. For each of clock cycles 2 through 18, the accumulated value in the feedback latch 52 is passed through multiplexer 36 to the MULTIPLICAND INPUT of the multiplier core 28. Multiplexer 32 outputs the constant $10 \times 2^{-17}$ received from constant port 30 and inputs into the MULTIPLIER INPUT of the multiplier core 28. The multiplier core then performs the multiplication and the product is added to the next digit which is loaded in A-latch 26 and is input through the ADDER INPUT of multiplier core 28. The new accumulated result is then shifted left 17-bit positions by shifter 38 and loaded into feedback latch 52. This process continues through clock cycle 18 to convert each of the eighteen digits. On the last clock cycle, the result is stored in feedback latch 52. The final result is passed unchanged through the multiplier core 28 to the converter 42. Converter 42 converts the final result to non-redundant format and stores it in E-latch 44 where it is available through system bus 12. Because the internal format of the multiplier circuit 10 is large enough to uniquely describe any 18-bit BCD number, no rounding is required.

The multiplier circuit of the present invention is also useful to convert real numbers to BCD numbers. The conversion of a number from a real to a BCD number begins in a mantissa arithmetic logic unit (not shown) associated with multiplier circuit 10. The mantissa arithmetic logic unit converts the real number to be converted to BCD format to an integer which is appropriately rounded to 64-bit positions and placed on the system bus on the most significant 64-bit positions. The integer is also checked to see if it is too large to be uniquely described by an eighteen digit BCD number.

The resulting integer value is loaded into the most significant 64 bits of D-latch 18. The constant $10^{-18}$ is input from system bus 12 through C-latch 14 and MUX 32 into the MULTIPLIER INPUT of the multiplier core 28, and is multiplied by the integer value which is input through the MULTIPLICAND INPUT using a four pass full precision multiplication operation. Because $10^{-18}$ cannot be exactly described by the 71-bit number stored in C-latch 14, the constant that is used has been carefully chosen to be slightly greater than $10^{-18}$, but not so large that it causes an error in the least significant bit of the result. Since the constant is larger than $10^{-18}$, and the result to be converted is guaranteed to be small enough to be described by an eighteen digit BCD value, the resulting BCD digit value will be larger than the actual value by less than one digit in the least significant bit position. Therefore, the BCD value never has to be rounded up, and the error resulting from the approximation of the constant $10^{-18}$ may be simply truncated. The multiplication by $10^{-18}$ positions the radix point just to the left of the most significant bit position. Multiplying by 10 moves the radix point to the right by 4-bit positions, leaving the most significant four bits of the result equal to the most significant BCD digit. This digit is stripped off and the remaining bits shifted to the right by 4-bit positions. The multiplication and addition process is continued until the eighteen BCD digits are accumulated.

An important technical advantage of the present invention becomes apparent at this point. Truncating the most significant bits of a signed digit number requires an additional conversion step as discussed previously. In the case of BCD conversions, the number that is being converted is always a positive number. However, if the top four bits are truncated, the next most significant bit may very well be a negative one. The negative one in this bit position required a borrow from one of the four bits which have been truncated. To correct the situation, the overflow bit must be set to a positive one.

After the result of the multiplication by the approximation of the constant $10^{-18}$ is stored in the feedback latch 52, the following sequence of steps is executed once for each BCD digit. The number in the feedback latch 52 is multiplied by $10 \times 2^{-17}$. The result is sent to the converter 42, the indicator 46 and the feedback latch 52. The leading thirteen bits of this result are always equal to zero. The next four bits of the result contain the next BCD digit value. The converter 42 does a normal signed digit to non-redundant conversion on each BCD digit value. The result of this conversion contains the next BCD digit in the four most significant bits of the number which, because of the multiplication by $10 \times 2^{-17}$, are bit positions 61 through 58. These bits are transferred to the mantissa arithmetic logic unit for accumulation through system bus 12.

As discussed previously, indicator 46 examines the bits of the result starting from the eighteenth bit down to determine if the result will be negative and therefore requires setting the overflow bit after the top seventeen bits are truncated.

This sequence of steps requires two clock cycles because of the path through the indicator 46. On the first clock cycle, the feedback latch 52 is not loaded because the signal from the indicator 46 that controls the setting of the overflow bit is not yet valid. On the second clock cycle, the feedback latch 52 is loaded with a value which is shifted left by 17-bit positions. This shift truncates the leading zeroes and the four most significant bit positions. The overflow bit is set according to the signal from the indicator 46.

Transcendental Function Calculation Specific Hardware

The multiplier circuit of the present invention is also specially suited to be used in conjunction with a novel method of calculating transcendental mathematical functions using polynomial expansions which is described in full in Applicants' copending application entitled "Method and Apparatus for Performing Mathematical Functions using Polynomial Approximation and a Rectangular Aspect Ratio Multiplier", Ser. No. 07/416,110, filed Jan. 25, 1990.

In summary, the aforementioned method of mathematical function calculation uses polynomials to approximate various transcendental functions. An exemplary fifth order polynomial written in the form:

$$a_5x^5 + a_4x^4 + \ldots a_1x + a_0$$

where $a_0$ through $a_5$ are constants and x equals the input argument may be rewritten using Horner's rule in the form:

$$((((a_5x+a_4)x+a_3)x+a_2)x+a_1)x+a_0$$

In this manner, exemplary fifth order polynomial can be evaluated by calculating five first order polynomial of the form Ax+B where x is the input argument, B is the next constant and A is initially the highest order constant and, in all subsequent iterations, is the ongoing product sum of all prior iterations.

As discussed previously with reference to the BCD conversion functions, the multiplier circuit of the present invention is capable of calculating the first order polynomial involved with each iteration using a maximum of four passes through multiplier core 28. In general, the first iteration of the evaluation process multiplies the highest order constant loaded in the C-latch 14 by the argument which is loaded in D-latch 18. The next constant is loaded in the A-latch 26 and is added during the formation of the final partial product. Because of variations in the number of significant data bits in the arguments and the constants, each multiplication may involve one, two, three or four passes through multiplier core 28 depending on the necessary precision. Regardless of the number of passes required, the next constant is added from the A-latch 26 on the pass which forms the final product.

This final product and sum is then converted and loaded into C-latch 14 where it can again be multiplied by the argument present in D-latch 18 during the next iteration.

Further, when less than full precision multiplication operations are required, for example, when only two passes through multiplier core 28 are required, the ongoing product sum is present in the most significant portion of C-latch 14 to allow for the maximum number of data bits in the data path. As the number of significant data bits and the magnitude of the ongoing product sum grows in successive iterations, the value is appropriately shifted to the right to keep from truncating most significant digits. In this manner, the multiplier circuit of the present invention incorporates the necessary data paths such that nth order polynomial approximations of mathematical functions can be efficiently calculated by repeated calculation of first order polynomials.

Summary

In summary, the present invention comprises a multiplier circuit which includes a rectangular aspect ratio multiplier core which allows for the implementation of several novel methods of performing mathematical functions. The multiplier circuit of the present invention efficiently and quickly performs the division, square root, BCD to real conversion, real to BCD conversion, and polynomial approximation of mathematical functions processes.

Although the present invention has been described in detail, it should be understood that various changes, substitutions and alterations can be made hereto without departing from the spirit and scope of the invention as defined by the appended claims.

What is claimed is:

1. An arithmetic circuit, comprising:
   a first register for storing a first operand;
   a second register for storing a second operand;
   a multiplier circuit having first and second inputs respectively coupled to said first and second registers, said multiplier circuit operable to generate and output a result comprising a product of said first and second operands in signed digit format, said product always being exact;
   a data path coupling said output of said multiplier to said second input of said multiplier; and
   a multiplexer circuit disposed in said data path, said multiplexer having a first input coupled to said second register, a second input coupled to said output of said multiplier circuit and an output coupled to said second input of said multiplier circuit, wherein said multiplexer circuit is operable to select one of said signed digit result and said second operand to be input into said multiplier circuit, and said multiplier circuit is operable to use said signed digit result as an operand of a multiplication operation without converting said signed digit result to a non-redundant format; and
   a first adder input into said multiplier circuit operable to receive a third operand, said multiplier circuit operable to generate a sum of said product and said third operand in a single pass through said arithmetic circuit.

2. The arithmetic circuit of claim 1 and further comprising:
   a second adder input into said multiplier circuit operable to receive a fourth operand, said multiplier circuit operable to generate a second sum of said product, said third operand and said fourth operand in a single pass through said arithmetic circuit.

3. The arithmetic circuit of claim 2 wherein said third operand comprises a multiple of one of said first and second operands such that the effective range of said arithmetic circuit is extended.

4. The arithmetic circuit of claim 2 wherein said fourth operand comprises a multiple of one of said first and second operands such that the effective range of said arithmetic circuit is extended.

5. The arithmetic circuit of claim 2 wherein said second sum may be any number less than or equal to a predetermined maximum value and wherein said arithmetic circuit further comprises:
   saturation circuitry coupled to said multiplier circuit operable to detect when said second sum exceeds said maximum value and operable to force the output of the arithmetic circuit equal to said maximum value in response to said detection.

6. The arithmetic circuit of claim 1 wherein said multiplier circuit comprises:
   an adder circuit coupled to said second register and operable to generate and output multiples of three times said second operand by adding said second operand to twice said second operand;
   a plurality of Booth recorder circuits coupled in parallel to said first register, each of said Booth recorder circuits operable to encode a portion of said first operand into Booth's format;
   a plurality of partial product generators each coupled to an output of a respective one of said Booth recorder circuits, each of said partial product generators having inputs coupled in parallel respectively to said second register and an output of said adder circuit, each of said partial product generators operable to generate and output a partial product of said first and second operands; and an adder tree circuit having inputs coupled respectively to an output of each of said partial product generators, said adder tree circuit operable to sum said partial products to form said product, said adder tree circuit having an additional input, said first adder input comprising said additional input of said adder tree circuits such that said adder tree circuit is operable to generate and output a sum of said product and said third operand.

7. An arithmetic circuit, comprising:
first register for storing a first operand;
a second register for storing a second operand; and
a multiplier circuit having first and second inputs respectively coupled to said first and second registers, a third input and an output, wherein:
said multiplier circuit is operable to generate a product in signed digit format of said first and second operands, said product always being exact;
said multiplier circuit is further operable to receive a third operand at said third input to generate a first sum of said product and said third operand in a single pass through said arithmetic circuit; and
wherein said multiplier circuit further comprises a fourth input for receiving a fourth operand, said multiplier circuit being operable to generate a second sum of said product, said third operand and said fourth operand in a single pass through said arithmetic circuit.

8. The arithmetic circuit of claim 7 wherein said fourth operand comprises a multiple of one of said first and second operands such that the effective range of said arithmetic circuit is extended.

9. The arithmetic circuit of claim 7, wherein said second sum may be any number less than or equal to a predetermined maximum value and wherein said arithmetic circuit further comprises:
saturation circuitry coupled to said multiplier circuit operable to detect when said second sum exceeds said maximum value and operable to force the output of the arithmetic circuit equal to said maximum value in response to said detection.

10. An arithmetic circuit, comprising:
a first register for storing a first operand;
a second register for storing a second operand; and
a multiplier circuit having first and second inputs respectively coupled to said first and second registers, a third input and on output, wherein:
said multiplier circuit is operable to generate a product in signed digit format of said first and second operands, said product always being exact; and
said multiplier circuit is further operable to receive a third operand at said third input to generate a first sum of said product and said third operand in a single pass through said arithmetic circuit; and
a data path coupling said output of said multiplier circuit to said third input such that a result output by said multiplier circuit in an initial pass through the arithmetic circuit may be used as said third operand in a subsequent pass through the arithmetic circuit.

11. The arithmetic circuit of claim 10 and further comprising a feedback register disposed in said data path and operable to store said result.

12. The arithmetic circuit of claim 11 and further comprising:

multiplexing circuitry coupled between said second input and said second register and between said second input and said feedback register, and multiplexing circuitry operable to select one of said second operand and said result for input into said multiplier circuit, said multiplier circuit operable to generate a product of said first operand and a selected one of said result and said second operand.

13. The arithmetic circuit of claim 12 wherein said multiplier circuit is operable to use said result as an input operand without converting said result to non-redundant format.

14. An arithmetic circuit, comprising:
a first register for storing a first operand;
a second register for storing a second operand; and
a multiplier circuit having first and second inputs respectively coupled to said first and second registers, a third input and an output, wherein:
said multiplier circuit is operable to generate a product in signed digit format of said first and second operands, said product always being exact; and
said multiplier circuit is further operable to receive a third operand at said third input to generate a first sum of said product and said third operand in a single pass through said arithmetic circuit; and
conversion circuitry coupled to said multiplier circuit for extracting a plurality of the most significant bits from a signed digit value output by said multiplier circuit, said conversion circuitry further operable to selectively change the value of an overflow bit associated with said signed digit value responsive to the sign of the most significant digit of the signed digit value not extracted such that the accuracy of the value remaining in said signed digit value is not affected by said extraction of said plurality of most significant bits.

15. An arithmetic circuit, comprising:
a first register for storing a first operand;
a second register for storing a second operand; and
a multiplier circuit having first and second inputs respectively coupled to said first and second registers, a third input and an output, said multiplier circuit being operable to generate an exact product in signed digit format of said first and second operands, and being further operable to receive a third operand at said third input to generate a first sum of said product and said third operand in a single pass through said arithmetic circuit, and wherein said multiplier circuit comprises:
an adder circuit coupled to said second register and operable to generate and output multiples of three times said second operand by adding said second operand to twice said second operand;
a plurality of Booth recorder circuits coupled in parallel to said first register, each of said booth recorder circuits operable to encode a portion of said first operand into Booth's format;
a plurality of partial product generators each coupled to an output of a respective one of said Booth recorder circuits, each of said partial product generators having inputs coupled in parallel respectively to said second register and an output of said adder circuit, each of said partial product generators operable to generate and output a partial product of said first and second operands; and
a adder tree circuit having inputs coupled respectively to an output of each of said partial product generators, said adder tree circuit operable to sum said partial products to form said product, said adder tree circuit having an additional input, said third input comprising said additional input of said adder tree circuit such that said adder tree circuit is operable to generate and output a sum of said product and said third operand.

16. An arithmetic circuit, comprising:

a first register for storing a first operand;

a second register for storing a second operand;

a multiplier circuit having first and second inputs respectively coupled to said first and second registers, said multiplier circuit operable to generate and output a result comprising a product of said first and second operands in signed digit format;

a data path coupled said output of said multiplier to said second input of said multiplier; and a multiplexer circuit disposed in said data path, said multiplexer having a first input coupled to said second register, a second input coupled to said output of said multiplier circuit and an output coupled to said second input of said multiplier circuit, wherein said multiplexer circuit is operable to select one of said signed digit result and said second operand to be input into said multiplier circuit, and said multiplier circuit is operable to use said signed digit result as an operand of a multiplication operation without converting said signed digit result to a non-redundant format; and wherein said multiplier circuit includes:

a third input for receiving a third operand, said multiplier circuit operable to generate a sum of said product and said third operand in a single pass through said arithmetic circuit;

an adder circuit coupled to said second register and operable to generate and output multiples of three times said second operand by adding said second operand to twice said second operand;

a plurality of Booth recoder circuits coupled in parallel to said first register, each of said Booth recoder circuits operable to encode a portion of said first operand into Booth's format;

a plurality of partial product generators each coupled to an output of a respective one of said Booth recoder circuits, each of said partial product generators having inputs coupled in parallel respectively to said second register and an output of said adder circuit, each of said partial product generators operable to generate and output a partial product of said first and second operands; and an adder tree circuit having inputs coupled respectively to an output of each of said partial product generators, said adder tree circuit operable to sum said partial products to form said product, said adder tree circuit having an additional input, said first adder input comprising said additional input of said adder tree circuits such that said adder tree circuit is operable to generate and output a sum of said product and said third operand.

* * * * *